United States Patent
Vilela et al.

(10) Patent No.: US 9,128,838 B2
(45) Date of Patent: Sep. 8, 2015

(54) SYSTEM AND METHOD OF HIGH INTEGRITY DMA OPERATION

(71) Applicant: Infineon Technologies AG, Neubiberg (DE)

(72) Inventors: Antonio Vilela, Mering (DE); Simon Cottam, Bristol (GB)

(73) Assignee: Infineon Technologies AG, Neubiberg (DE)

(*) Notice: Subject to any disclaimer, the term of this patent is extended or adjusted under 35 U.S.C. 154(b) by 211 days.

(21) Appl. No.: 13/957,851

(22) Filed: Aug. 2, 2013

(65) Prior Publication Data

US 2015/0039944 A1    Feb. 5, 2015

(51) Int. Cl.
| | |
|---|---|
| *G06F 11/00* | (2006.01) |
| *G06F 11/07* | (2006.01) |
| *G06F 11/16* | (2006.01) |
| *G06F 11/22* | (2006.01) |
| *G06F 11/277* | (2006.01) |

(52) U.S. Cl.
CPC ............ *G06F 11/0772* (2013.01); *G06F 11/16* (2013.01); *G06F 11/2221* (2013.01); *G06F 11/277* (2013.01)

(58) Field of Classification Search
CPC ... G06F 11/277; G06F 11/16; G06F 11/2221; G06F 13/28; G06F 11/263; G06F 15/16; G06F 3/00
See application file for complete search history.

(56) References Cited

U.S. PATENT DOCUMENTS

| | | | |
|---|---|---|---|
| 6,185,634 B1* | 2/2001 | Wilcox | 710/26 |
| 6,453,366 B1* | 9/2002 | Broberg et al. | 710/26 |
| 7,324,438 B1* | 1/2008 | Savoldi et al. | 370/216 |
| 2008/0109569 A1* | 5/2008 | Leonard et al. | 710/22 |
| 2009/0168657 A1* | 7/2009 | Puri et al. | 370/248 |
| 2011/0191506 A1* | 8/2011 | Srinivasan | 710/22 |

* cited by examiner

*Primary Examiner* — Charles Ehne
(74) *Attorney, Agent, or Firm* — Eschweiler & Associates, LLC

(57) ABSTRACT

A system and method for direct memory access (DMA) operation provides for receiving DMA requestors, assigning the received DMA requestors to one or more of a plurality of DMA engines for processing the received DMA requestors, and if one of the received DMA requestors is a safety requestor, assigning the safety requestor to at least two DMA engines of the plurality of DMA engines for processing the safety requestor, disabling a bus interface for coupling at least one DMA engine of the at least two DMA engines to memories, comparing the outputs of the at least two DMA engines, and generating an error message if the comparison of the outputs of the at least two DMA engines are different from each other.

20 Claims, 2 Drawing Sheets

SYSTEM AND METHOD OF HIGH INTEGRITY DMA OPERATION

FIELD

Certain embodiments of the disclosure relate to providing diagnostic coverage in computational systems and methods. More specifically, certain embodiments of the disclosure relate to high integrity direct memory access operations for high diagnostic fault coverage for safety-critical operations performed by computational systems and methods.

BACKGROUND

Modern automotive electronic control units (ECUs) are integrating more and more functionality. This trend is driven by technology scaling that enables a high level of integration, and by cost considerations of a highly competitive automotive industry that forces a reduction in the total number of ECUs per car. Electronics play an increasingly important role in providing advanced driving assistance functions, and in particular, preventing hazards that may reduce the number of fatal injuries.

In the context of safety applications, microcontrollers of ECUs which serve vital functions have been developed with redundant hardware structures. Although current sub-micron technologies (65 nm and below) may enable the area overhead required to implement redundant hardware structures, power consumption is the main limiting factor to realizing such redundant structures in practice. Hardware structure redundancy is not only the current state of the art for CPUs, but is sometimes extended to functions performed by interrupt controllers and direct memory access (DMA) engines. DMA engines play a key role in many safety applications, especially in the acquisition of safety-related information.

It would be desirable to provide an optimal use of DMA hardware resources by taking advantage of existing hardware redundancies to provide an on-demand high integrity operation mode where several DMA resources may not only be used concurrently, but whose data resources may be checked at the DMA level.

SUMMARY

According to an embodiment of the disclosure, a method for direct memory access (DMA) operation comprises receiving DMA requestors, assigning the received DMA requestors to one or more of a plurality of DMA engines for processing the received DMA requestors, and if one of the received DMA requestors is a safety requestor, assigning the safety requestor to at least two DMA engines of the plurality of DMA engines for processing the safety requestor, disabling a bus interface coupled to at least one DMA engine of the at least two DMA engines, and comparing the outputs of the at least two DMA engines. The plurality of DMA engines may be coupled to the bus interface, and the bus interface may be coupled to one or memories.

In one embodiment, the method comprises generating an error message if the comparison of the outputs of the at least two DMA engines are different from each other, and subsequently alerting a user of an application associated with (e.g., utilizing) the DMA operation of an application failure based upon the error message.

According to another embodiment of the disclosure, a system comprises at least one processor core, at least one memory coupled to the at least one processor core, and a direct memory access (DMA) unit.

In one embodiment, the DMA unit comprises a bus interface coupled to the at least one memory, a plurality of DMA engines coupled to the bus interface, a requestor arbitration unit coupled to the plurality of DMA engines, a synchronization unit coupled to the requestor arbitration unit, the plurality of DMA engines, and the bus interface, and a DMA comparator coupled to the synchronization unit and the plurality of DMA engines.

In a further embodiment, the requestor arbitration unit is configured to receive DMA requestors and assign the received DMA requestors to one or more of the plurality of DMA engines for processing the received DMA requestors, and the synchronization unit is configured to detect if one of the received DMA requestors is a safety requestor. If one of the received DMA requestors is a safety requestor, the synchronization unit is further configured to select at least two DMA engines of the plurality of DMA engines for processing the safety requestor, disable the bus interface coupled to at least one DMA engine of the at least two DMA engines, and enable the DMA comparator to compare the outputs of the at least two DMA engines.

According to another embodiment, the system further comprises one or more peripheral devices, and the DMA requestors comprise parameters that enable the one or more of the plurality of DMA engines to perform data transfers between the one or more peripheral devices and the at least one memory, or between the at least one memory.

In another embodiment, the DMA comparator is configured to generate an error message if the outputs of the at least two DMA engines are different from each other, and the at least one processor core is configured to alert a user of an application being executed by the at least one processor core of an application failure based upon the error message.

These and other advantages, aspects and novel features of the present disclosure, as well as details of an illustrated embodiment thereof, will be more fully understood from the following description and drawings.

DETAILED DESCRIPTION

Computers, microcontrollers and microprocessors typically include direct memory access (DMA) that allow certain hardware components within these devices to access the device's memory for data reading and writing tasks. The DMA enables these tasks to occur without the hardware having to directly access a central processing unit (CPU). DMA is useful when, for example, a CPU cannot keep up with the rate of data transfer, or where the CPU could otherwise perform useful work while waiting for a relatively slow I/O data transfer.

Figure 1:
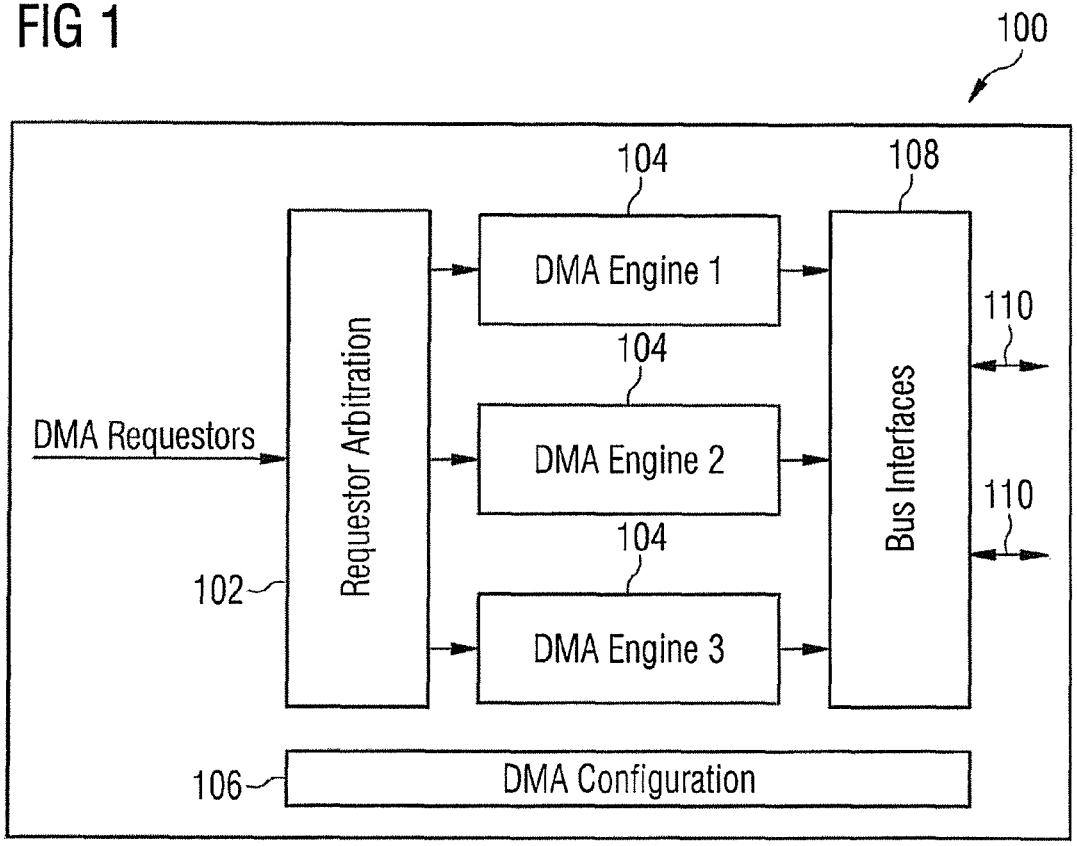
FIG. 1 is a schematic diagram of a typical DMA architecture.

FIG. 1 is a schematic diagram of a typical DMA architecture 100. Components of the DMA architecture 100 include a requestor arbitration unit 102, one or more DMA engines 104, a DMA configuration unit 106, and a bus interface 108.

The DMA architecture 100 is configured to perform DMA memory operations, such as providing hardware components of a system in which the DMA architecture 100 is embedded direct read-write access to memory (not shown). In operation, DMA requestors may be assigned via the requestor arbitration unit 102 either statically or dynamically to each of the DMA engines 104. Each of the DMA engines 104 are connected to on-chip buses 110 to enable load (i.e. read) and store (i.e., write) request operations. The bus interface 108 arbitrates load/store requests to the on-chip busses 110. The DMA configuration unit 106 typically configures the DMA engines 104 during code initialization. For example, the DMA engines 104 can be configured to move data in parallel with a processing core (not shown) performing other basic processing tasks.

Figure 2:
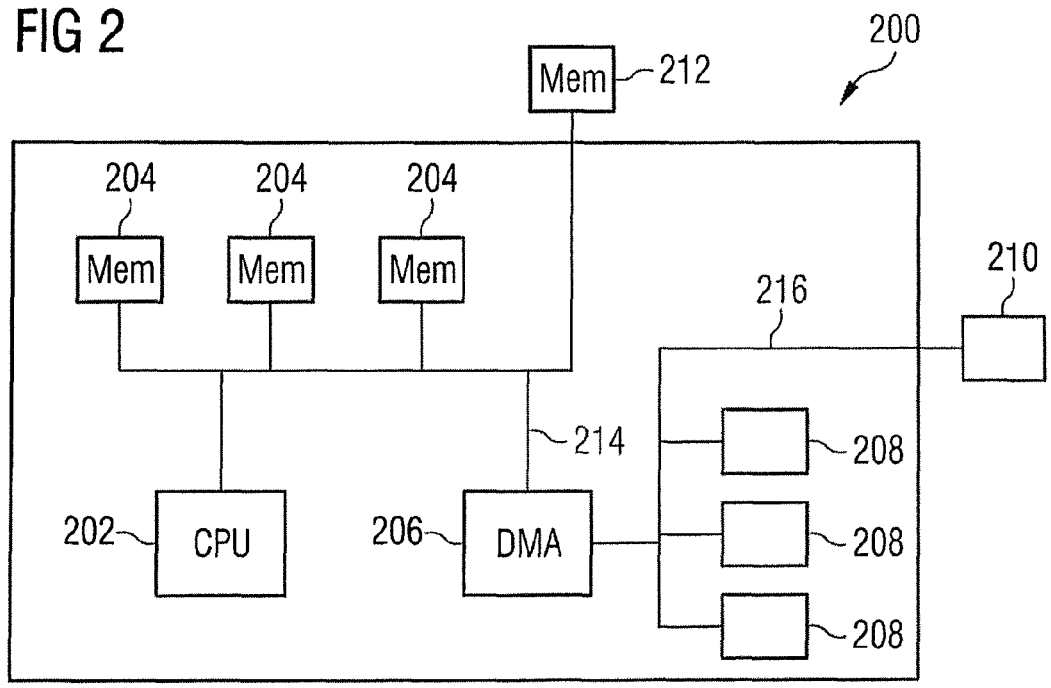
FIG. 2 is a schematic diagram of a system for dual-mode DMA operation, according to an embodiment of the disclosure.

FIG. 2 is a schematic diagram of a system 200 for dual-mode DMA operation, according to an embodiment of the disclosure. The system 200 includes a central processing unit (CPU) 202, which may also be referred to as a processor core, internal memory 204, a direct memory access (DMA) unit 206, optional internal peripherals 208, an optional external peripheral 210, an external memory 212, a first bus 214, and a second bus 216. The scope of the present disclosure covers any number of internal/external memories, any number of internal/external peripherals, any number of processor cores, and any number of data/address/control buses. In one embodiment of the disclosure, the system 200 is a microcontroller, which may include other conventional microcontroller hardware components (not shown) known to those of skill in the art. In other embodiments, the system 200 may be a computer or a microprocessor.

In one embodiment, the internal memory 204 may comprise memory internal to the CPU 202 (e.g., CPU registers), and/or or may comprise memories of different sizes, access speeds, and operating speeds, dependent upon the type of memory and the distance the memory is physically located from the processor core 202. The optional peripherals 208 and 210 may represent additional hardware components typical of computational and control systems. As illustrated, the optional peripherals and memory may be external or internal to these systems. As known to those of skill in the art, the buses of the system 200 may carry control, data, and address signals.

In operation, and according to one embodiment of the disclosure, the processor core 202 may instruct the DMA unit 206 to perform data transfers between internal memories, external memories, and the optional peripherals. In this way, the DMA unit 206 can relieve the processor core 202 of performing these data transfers. In another embodiment of the disclosure, the DMA unit 206 is configured to be switched between a standard mode of operation and a high-integrity (i.e., redundant) mode of operation.

In the standard mode of operation, the DMA unit 206 receives one or more DMA requestors from the memories 204 and/or 212, for example, in response to a command from the CPU 202 and/or a command from one or more of the optional peripherals 208 and/or 210. In another embodiment, the DMA unit 206 receives one or more DMA requestors directly from the CPU 202 and/or from one or more of the optional peripherals 208 and/or 210.

In one embodiment, the DMA requestors may include one or more of addresses of source and/or destination memory locations, addresses of subsequent requestors, control information (e.g., enable requests, CPU interrupts, and dimensionality (1D, 2D, 3D) of core processor task), the number of bytes per data transfer, and directionality of the data transfer (e.g., read (load) or write (store) request). The DMA unit 206 then performs data transfers between any combination of internal memories 204, external memories 212, internal peripherals 208, external peripherals 210, and/or registers of any of the system components (e.g., registers of the CPU 202) based upon the received DMA requestors.

The DMA unit 206 may also receive one or more DMA requestors called safety requestors. In one embodiment of the disclosure, reception of a safety requestor by the DMA unit 206 triggers the DMA unit 206 to operate in a high integrity (i.e., redundant) mode of operation. For example, if the DMA unit 206 is initially operating in the standard mode of operation, reception of a DMA requestor which is a safety requestor triggers the DMA requestor 206 to switch to the redundant mode of operation.

In one embodiment of the disclosure, the DMA unit 206 operates in the redundant mode of operation in order to provide high diagnostic fault coverage of safety-critical information (e.g., data) generated or used during the execution of safety-critical tasks by the CPU 202 and/or one or more of the peripherals 208 and 210. The redundant mode of operation is described in more detail further below in conjunction with FIG. 3.

Figure 3:
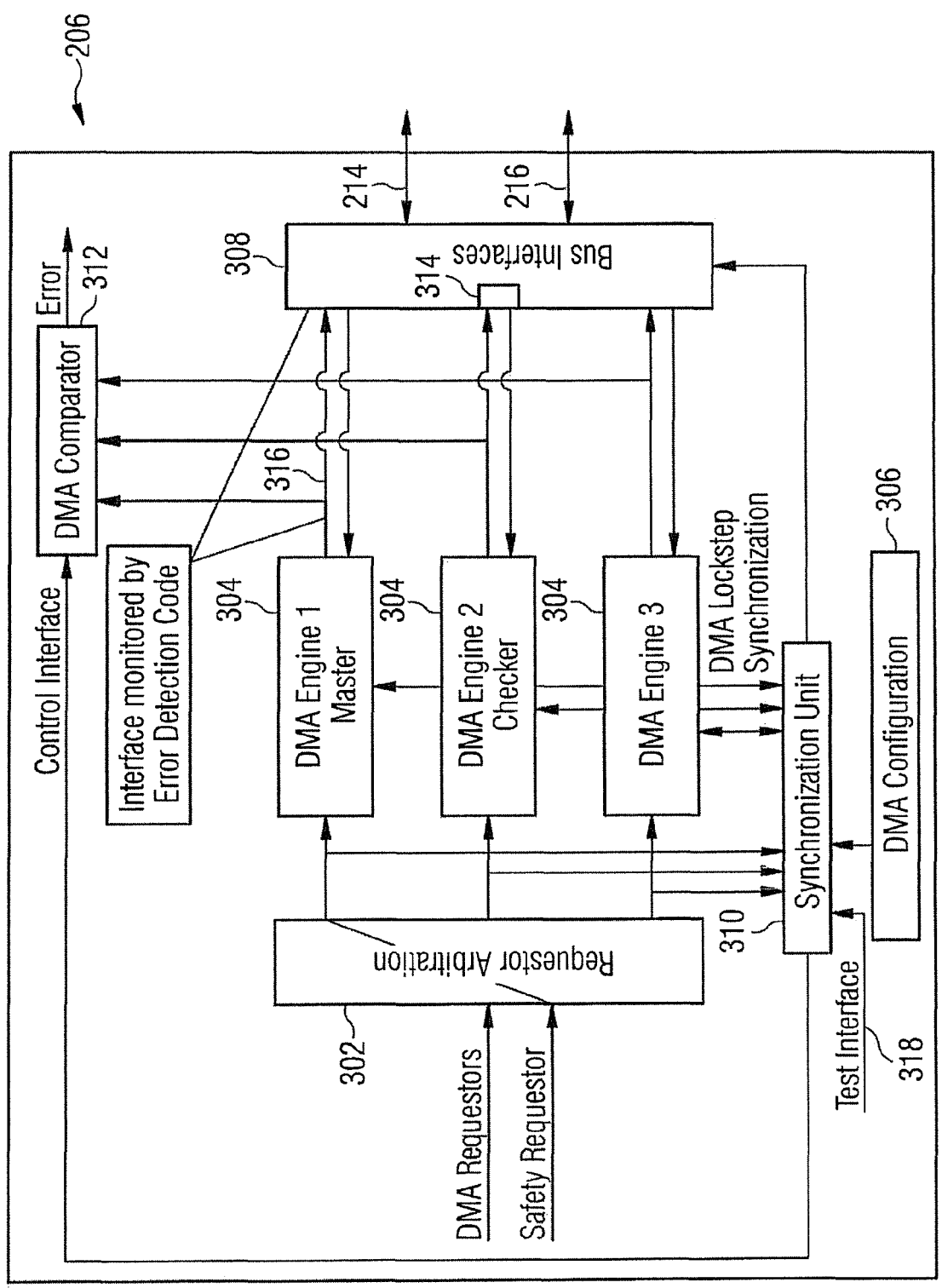
FIG. 3 is a schematic diagram of the DMA unit illustrated in FIG. 2, according to an embodiment of the disclosure.

FIG. 3 is a schematic diagram of DMA unit 206 illustrated in FIG. 2, according to an embodiment of the disclosure. The DMA unit 206 includes a requestor arbitration unit 302, one or more DMA engines 304, a DMA configuration unit 306, a bus interface 308, a synchronization unit 310, and a DMA comparator 312. The requestor arbitration unit 302, the one or more DMA engines 304 and the DMA configuration unit 306 may be similar to the corresponding components illustrated in FIG. 1.

In one embodiment, the bus interface 308 comprises independently controllable DMA engine interfaces. For example, the bus interface 308 includes three independently controllable DMA engine interfaces for coupling with the three DMA engines 304. For simplicity of illustration, FIG. 3 illustrates only one of these interfaces (i.e., second DMA engine interface 314 of bus interface 308 for coupling independently with the second DMA engine 304).

In a standard mode of operation, the requestor arbitration unit 302 receives one or more DMA requestors. The requestor arbitration unit 302 receives one or more DMA requestors from the memories 204 and/or 212 (FIG. 2), for example, in response to a command from the CPU 202 (FIG. 2) and/or a command from one or more of the optional peripherals 208 and/or 210 (FIG. 2). In another embodiment, the requestor arbitration unit 302 receives one or more DMA requestors directly from the CPU 202 (FIG. 2) and/or from one or more of the optional peripherals 208 and/or 210 (FIG. 2).

The DMA arbitration unit 302 is configured to arbitrate the received DMA requestors to one or more of the DMA engines 304. In one embodiment, one or more of the DMA engines may include an address bus (not shown), a data bus (not shown), and control registers (not shown), as known to those of skill in the art. The DMA engines 304 may request access to any memory resource, whether the memory resource is internal or external to any system (e.g., system 200, FIG. 2) in which the DMA unit 206 is integrated, or whether the memory resource is associated with other hardware components of the system, such as peripherals 208 and 210 (FIG. 2) or only accessible by the other hardware components. The DMA engines 304 may also generate interrupts (to signal to a core processor (e.g., CPU 202, FIG. 2) that data transfer is complete, for example), without requiring a processor to otherwise assist with data transfer.

In one embodiment, one or more of the DMA engines 304 generates read and/or write requests (i.e., load/store requests) based upon the received DMA requestors, and the bus interface 308 then arbitrates the DMA engine load/store requests to on-chip buses 214 and/or 216. The on-chip buses are the control/address/data buses that couple the DMA unit 206 to other components (e.g., memories, CPUs, and/or peripherals), or to I/O ports (not shown) for coupling to external components via external bus lines.

In one embodiment, one or more of the DMA engines 304 are operated simultaneously. In another embodiment, only one DMA engine 304 is operated at a time. In another embodiment, each DMA engine 304 may be associated with a single peripheral device or a single processor core. In yet another embodiment, a plurality of the DMA engines 304 may be associated with a single processor core.

In another embodiment of the present disclosure, the DMA unit 206 is configured to perform DMA operations in a redundant (i.e., high integrity) mode when safety-critical tasks are executed and safety-critical data are generated or used. In one embodiment of the redundant mode of operation, the diagnostic coverage of safety-critical data is defined to be in compliance with ISO standards for safety microcontrollers and/or IEC standards for industrial microcontrollers. However, the scope of the present disclosure covers other types of regional and/or global standards for diagnostic coverage of data, whether or not such data is associated with safety-critical tasks.

In one embodiment of the disclosure, the DMA unit 206 may be adapted to switch from performing DMA operations in a standard (i.e., non-redundant) mode to performing DMA operations in a redundant mode upon reception of a safety requestor by the requestor arbitration unit 302. A safety requestor may be a special type of DMA requestor that comprises one or more of the parameters of the DMA requestors, and additionally comprises information that notifies the DMA unit 206 that a safety-critical task will be executed by one or more of the peripheral devices 208 and/or 210 and/or the processor core 202. A safety-critical task includes the transfer of safety-critical data between any combination of internal memories 204, external memories 212, internal peripherals 208, external peripherals 210, and/or registers of any of the system components (e.g., registers of the CPU 202) based upon the received one or more safety requestors.

By way of an example embodiment of operation, the DMA unit 206 may be initially operating in the standard mode of operation, receiving DMA requestors as described above. However, reception by the requestor arbitration unit 302 of a DMA requestor called a safety requestor triggers the DMA unit 206 to be switched from the standard mode of operation to a high integrity (redundant) mode of operation. Upon reception of the safety requestor, the requestor arbitration unit 302 assigns the safety requestor to a first DMA engine 304 for processing. The first DMA engine 304 may be any one of the DMA engines, or it may be a DMA engine that is predefined to be assigned the safety requestors. In one embodiment, the requestor arbitration unit 302 assigns the safety requestor to a DMA engine that is presently idle, and in another embodiment the requestor arbitration unit 302 assigns the safety requestor to a DMA engine that is associated with the least number of error signals which may be indicative of, for example, faulty registers or other hardware components. The first DMA engine 304 which is assigned to process the received safety requestor is also referred to as the master DMA engine. In one embodiment, the master DMA engine, upon reception of the safety requestor, recognizes that a safety-critical task is pending and thus waits for a start signal from the synchronization unit 310. In waiting for the start signal, the master DMA engine may either terminate any presently running data transfers or complete any presently running data transfers.

In another embodiment, the requestor arbitration unit 302 sends the synchronization unit 310 safety requestor information associated with the received safety requestor which indicates to the synchronization unit 310 that the requestor arbitration unit 302 has received a safety requestor and has assigned the safety requestor to a particular DMA engine.

Upon receipt of the safety requestor information, or upon receipt of the safety requestor via the requestor arbitration unit 302, the synchronization unit 310 sends an acknowledgement request to the other DMA engines 304, in one embodiment of the disclosure. The other DMA engines 304 are configured to respond to a received acknowledgement request with an acknowledgement message. In one embodiment, the synchronization unit 310 selects the first DMA engine (of the other DMA engines 304 to acknowledge the acknowledgement request) to be a DMA checker engine. For example, by way of an exemplary embodiment, if the synchronization unit 310 receives a first acknowledgement message from the second DMA engine 304, the synchronization unit 310 designates the second DMA engine 304 as the DMA checker engine.

After receiving the first acknowledgement message from one of the other DMA engines 304, the synchronization unit 310 locks the DMA comparator 312, using a control interface, to compare the output of the master DMA engine with the output of the checker DMA engine. In one embodiment of the disclosure, the DMA comparator 312, once locked, is configured to compare the output of the master DMA engine with the output of the checker DMA engine on a cyclical basis (e.g., compare output generated by the DMA master and checker engines at every clock cycle, or in other words, operate the DMA engines in lockstep). If the DMA comparator 312 determines that the output of the DMA master and the output of the DMA checker is not identical to each other at any one of the clock cycles, the DMA comparator 312 generates an error message.

In another embodiment, the DMA comparator 312 only generates an error message if the number of clock cycles at which the comparisons of the outputs are not the same is greater than a predefined or a programmable threshold. In one embodiment, the error message may be an error message interrupt, which upon receipt by a corresponding core processor (or any other system hardware/software component (not shown) or peripheral device hardware/software component (not shown)), enables the core processor (and/or the one or more other hardware/software components) to either direct a warning alert to a user of the peripheral device or the user of an embedded application, for example, or to shut down operation of the peripheral device or the embedded application, particularly when the devices and/or embedded applications are associated with safety-critical tasks, failure of which could lead to injury or death. The other system hardware/software components (not shown) or peripheral device hardware/software components (not shown) may, for example, comprise components that can be configured to react to an error and accordingly bring the system to a fail-safe state.

In one embodiment of the disclosure, the synchronization unit 310 enables the master and the checker DMA engines to operate synchronously on the same one or more safety requestors (i.e., operate on the same DMA channel configuration in lockstep).

In one embodiment, when the DMA unit 206 is operating in redundant mode (i.e., in lockstep DMA engine operation), the synchronization unit 310 disables the DMA checker engine bus interface 314 (coupled to the output of the DMA checker engine) such that the DMA checker engine bus interface 314 does not receive any output from the DMA checker engine. In one embodiment of the lockstep DMA engine operation, the synchronization unit 310 configures the bus interface 308 to only receive output from the DMA master engine by disabling the individual DMA engine bus interfaces to the checker DMA engine and the other remaining DMA engines.

During the redundant mode of operation, although the DMA comparator 312 works in lockstep (i.e., operates synchronously and cyclically on the same one or more safety requestors), the bus interface 308 does not work in lockstep. Thus, in one embodiment of the disclosure, any data/address/control signals sent from the DMA master engine via on-chip buses 214 and 316 are monitored by Error Detection Codes to ensure that the path from the DMA master engine to either an internal or external memory or a memory associated with a peripheral is protected. The scope of the present disclosure covers any conventional Error Detection Codes known to those of skill in the art, such as a Cyclic Redundancy Check (CRC).

In one embodiment of the disclosure, when the DMA unit 206 receives a DMA requestor which is not a safety requestor, after receiving one or more safety requestors, the synchronization unit 310, upon detection of the received DMA requestor, releases the lockstep DMA engine operation and enables the disabled DMA checker engine bus interface 314, thereby effectively configuring the DMA unit 206 to operate in the standard mode of operation.

In another embodiment of the disclosure, and as illustrated in FIG. 3, the synchronization unit 310 may optionally comprise a test interface 318. In one embodiment, the test interface 318 is coupled to the CPU 202 via the first bus 214. The test interface is configured to receive a test control message. In one embodiment, upon reception of the test control message the synchronization unit 310 switches the DMA unit 206 from the standard mode of operation to the high integrity (redundant) mode of operation. The synchronization unit 310 then assigns a first DMA engine 304 as a master engine and a second DMA engine as a checker engine, or in another embodiment, the synchronization unit 310 assigns the master and checker engines according to the content of the test control message. The DMA unit 206 then operates in the redundant mode of operation as described above.

The optional test interface 318 and test control messages enable a user of the system 200 to verify whether at any given time the intended synchronization between any two DMA engines can effectively detect errors and propagate the error message.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for direct memory access (DMA) operation, comprising:
    receiving DMA requestors;
    assigning the received DMA requestors to one or more of a plurality of DMA engines for processing the received DMA requestors, wherein the plurality of DMA engines are coupled to a bus interface, and wherein the bus interface is coupled to one or more memory units; and
    if one of the received DMA requestors is a safety requestor:
        assigning the safety requestor to at least two DMA engines of the plurality of DMA engines for processing the safety requestor,
        disabling the bus interface coupled to at least one DMA engine of the at least two DMA engines, and
        comparing the outputs of the at least two DMA engines.

2. The method according to claim 1, wherein assigning the safety requestor to at least two DMA engines comprises selecting a first DMA engine of a plurality of DMA engines as a main DMA engine for processing the safety requestor and selecting a second DMA engine of the plurality of DMA engines as a checker DMA engine for processing the safety requestor, wherein disabling the bus interface comprises disabling the bus interface of the checker DMA engine, and wherein comparing the outputs comprises comparing the outputs of the main DMA engine and the checker DMA engine.

3. The method according to claim 2, further comprising, if the comparison of the outputs of the main DMA engine and the checker DMA engine are different from each other, generating an error message.

4. The method according to claim 3, further comprising alerting a user of an application associated with the DMA operation of an application failure based upon the error message.

5. The method according to claim 2, further comprising synchronizing the master DMA engine and the checker DMA engine for synchronously processing the safety requestor, and wherein comparing the outputs comprises comparing the outputs of the main DMA engine and the checker DMA engine at every clock cycle.

6. The method according to claim 1, wherein the DMA requestors comprise one or more parameters which enable the one or more of the plurality of DMA engines to perform data transfers between memories.

7. A system, comprising:
    at least one processor core;
    at least one memory coupled to the at least one processor core; and
    a direct memory access (DMA) unit, comprising:
        a bus interface coupled to the at least one memory;
        a plurality of DMA engines coupled to the bus interface;
        a requestor arbitration unit coupled to the plurality of DMA engines, the requestor arbitration unit configured to receive DMA requestors and assign the received DMA requestors to one or more of the plurality of DMA engines for processing the received DMA requestors;
        a synchronization unit coupled to the requestor arbitration unit, the plurality of DMA engines, and the bus interface; and
        a DMA comparator coupled to the synchronization unit and the plurality of DMA engines, wherein the synchronization unit is configured to:
            detect if one of the received DMA requestors is a safety requestor; and
            if one of the received DMA requestors is a safety requestor, select at least two DMA engines of the plurality of DMA engines for processing the safety requestor, disable the bus interface coupled to at least one DMA engine of the at least two DMA engines, and enable the DMA comparator to compare the outputs of the at least two DMA engines.

8. The system according to claim 7, wherein the synchronizing unit is configured to select a first DMA engine of a plurality of DMA engines as a main DMA engine for processing the safety requestor, select a second DMA engine of the plurality of DMA engines as a checker DMA engine for processing the safety requestor, disable the bus interface of the checker DMA engine, and enable the DMA comparator to compare the outputs of the main DMA engine and the checker DMA engine.

9. The system according to claim 8, wherein the DMA comparator is configured to generate an error message if the outputs of the main DMA engine and the checker DMA engine are different from each other.

10. The system according to claim 9, wherein the at least one processor core is configured to alert a user of an application being executed by the at least one processor core of an application failure based upon the error message.

11. The system according to claim 8, wherein the synchronizing unit is configured to synchronize the master DMA engine and the checker DMA engine for synchronously processing the safety requestor, and wherein the DMA comparator is configured to compare the outputs of the master DMA engine and the checker DMA engine at every clock cycle.

12. The system according to claim 7, wherein the DMA requestors comprise one or more parameters which enable the one or more of the plurality of DMA engines to perform data transfers to or from the at least one memory.

13. The system according to claim 7, wherein the system further comprises one or more peripheral devices, and the DMA requestors comprise parameters which enable the one or more of the plurality of DMA engines to perform data transfers between the one or more peripheral devices and the at least one memory.

14. The system according to claim 7, wherein the at least one processor core, the at least one memory, and the DMA unit comprise components of a microcontroller.

15. A system, comprising:
means for receiving DMA requestors;
means for assigning the received DMA requestors to one or more of a plurality of DMA engines for processing the received DMA requestors, wherein the plurality of DMA engines are coupled to a bus interface, and wherein the bus interface is coupled to one or more memory units; and
if one of the received DMA requestors is a safety requestor:
means for assigning the safety requestor to at least two DMA engines of the plurality of DMA engines for processing the safety requestor,
means for disabling the bus interface coupled to at least one DMA engine of the at least two DMA engines, and
means for comparing the outputs of the at least two DMA engines.

16. The system according to claim 15, wherein the means for assigning the safety requestor to at least two DMA engines comprises means for selecting a first DMA engine of a plurality of DMA engines as a main DMA engine for processing the safety requestor and means for selecting a second DMA engine of the plurality of DMA engines as a checker DMA engine for processing the safety requestor, wherein the means for disabling the bus interface comprises means for disabling the bus interface of the checker DMA engine, and wherein the means for comparing the outputs comprises means for comparing the outputs of the main DMA engine and the checker DMA engine.

17. The system according to claim 16, further comprising means for generating an error message if the comparison of the outputs of the main DMA engine and the checker DMA engine are different from each other.

18. The system according to claim 17, further comprising means for alerting a user of an application associated with the DMA operation of an application failure based upon the error message.

19. The system according to claim 16, further comprising means for synchronizing the master DMA engine and the checker DMA engine for synchronously processing the safety requestor, and wherein the means for comparing the outputs comprises means for comparing the outputs of the main DMA engine and the checker DMA engine at every clock cycle.

20. The system according to claim 15, wherein the DMA requestors comprise one or more parameters which enable the one or more of the plurality of DMA engines to perform data transfers between memories.

* * * * *